(12) United States Patent
Tsuruta et al.

(10) Patent No.: US 6,352,250 B1
(45) Date of Patent: Mar. 5, 2002

(54) VEHICLE SUSPENSION SYSTEM

(75) Inventors: Mikio Tsuruta; Hiroyuki Kawabe; Yoshimitsu Kobayashi; Shin Matsumoto; Michiru Yoshida, all of Tokyo-To (JP)

(73) Assignee: Fuji Jukogyo Kabushiki Kaisha, Tokyo-To (JP)

( * ) Notice: Subject to any disclaimer, the term of this patent is extended or adjusted under 35 U.S.C. 154(b) by 0 days.

(21) Appl. No.: 09/412,972

(22) Filed: Oct. 6, 1999

(30) Foreign Application Priority Data

Oct. 7, 1998 (JP) ............................................ 10-285741

(51) Int. Cl.[7] .............................................. B60G 13/00
(52) U.S. Cl. ...................... 267/220; 267/140.4; 188/379
(58) Field of Search ........................ 188/379; 267/220, 267/221, 222, 223, 217, 140.11, 140.12, 293, 140.3, 140.4; 280/124.155, 124.108

(56) References Cited

U.S. PATENT DOCUMENTS 4,736,701 A * 4/1988 Kondo et al. ............... 188/379
5,421,564 A * 6/1995 Kohlmeier et al. ......... 267/220
6,123,350 A * 9/2000 Suzuki ........................ 188/379

FOREIGN PATENT DOCUMENTS

| FR | 2 535 259 | * | 5/1984 |
| JP | 63-97413 | | 4/1988 |
| JP | 02-068212 | * | 3/1990 |
| JP | 08-207539 | * | 8/1996 |

* cited by examiner

*Primary Examiner*—Christopher P. Schwartz
*Assistant Examiner*—Thomas J. Williams
(74) *Attorney, Agent, or Firm*—Smith, Gambrell & Russell, LLP (57) ABSTRACT

A dynamic damper is disposed between an upper spring seat and a strut mount, comprising a supporting plate secured to a piston rod of a strut and an annular inertia mass body mounted on the supporting plate through an elastic member. The annular inertia mass body is connected at two edge portions thereof located opposite to each other across the diameter with the supporting plate by a bolt and nut through the elastic member, respectively.

13 Claims, 8 Drawing Sheets

VEHICLE SUSPENSION SYSTEM

BACKGROUND OF THE INVENTION

1. Field of the Invention

The present invention relates to vehicle suspension systems, and more particularly, to a suspension system with a dynamic damper for reducing resonance noises generated mainly in a rear seat while a vehicle travels on bumpy roads.

2. Background Art

For example, when a two-box type vehicle travels on a bumpy road, "hoot noises" belonging to a medium frequency band ranging from 310 to 370 Hz or "roaring noises" belonging to a low frequency band ranging from 160 to 190 Hz, may be generated from a rear seat or thereabout of the vehicle.

Investigations into sources of those noises have revealed that the noises of the medium frequency band is originated mainly from a strut of a rear suspension system resonated in the widthwise direction of the vehicle by a road surface input of 340 Hz or thereabout and the noises of the low frequency band is originated mainly from the strut resonated in the vertical direction by a road surface input of 180 Hz or thereabout.

In order to reduce the amplitude of such resonance vibrations, leading to the reduction of noises, it is an effective means to attach a dynamic damper composed of a spring-mass system to a suspension system to cause a resonance in the dynamic damper. As such an example of reducing the resonance amplitudes of the strut by means of the dynamic damper, there is a technique disclosed by Japanese Patent Application Laid-open No. Toku-Kai-Shou 63-97413.

This background technique is for reducing shimmy and includes a dynamic damper provided at the lower part of a strut of the front suspension system. The dynamic damper comprises a ring-shaped mass member, an intermediate sleeve rigidly fitted over the strut and two rubber elastic bodies provided opposite to each other for bonding these to the strut by vulcanization.

However, according to this technique, when this construction is applied to a rear suspension system, since the dynamic damper is mounted at the lower part of the strut in such a manner that it projects from the outer periphery of the strut, the dynamic damper has a possibility that it interferes with a wheel or a wheel apron depending on the arrangement of surrounding components, this resulting in an up-sizing of the wheel apron. Further, the dynamic damper has a fear that it is scratched by stones sent flying by a tire or splashed mud.

SUMMARY OF THE INVENTION

It is an object of the present invention to provide a suspension system capable of effectively reducing noises in the medium frequency band and more preferably in the low frequency band in the rear seat and whose component members are free from the fear of interference with other body component members.

To attain the object, a dynamic damper is provided with a strut of the suspension system. The dynamic damper is disposed between an upper spring seat and a strut mount and comprises a supporting plate secured to a piston rod of the strut and an annular inertia mass body mounted on the supporting plate through an elastic member. The annular inertia mass body is connected at two edge portions thereof located opposite to each other across the diameter with the supporting plate by a bolt and nut through the elastic member, respectively.

DESCRIPTION OF PREFERRED EMBODIMENTS

Figure 1:
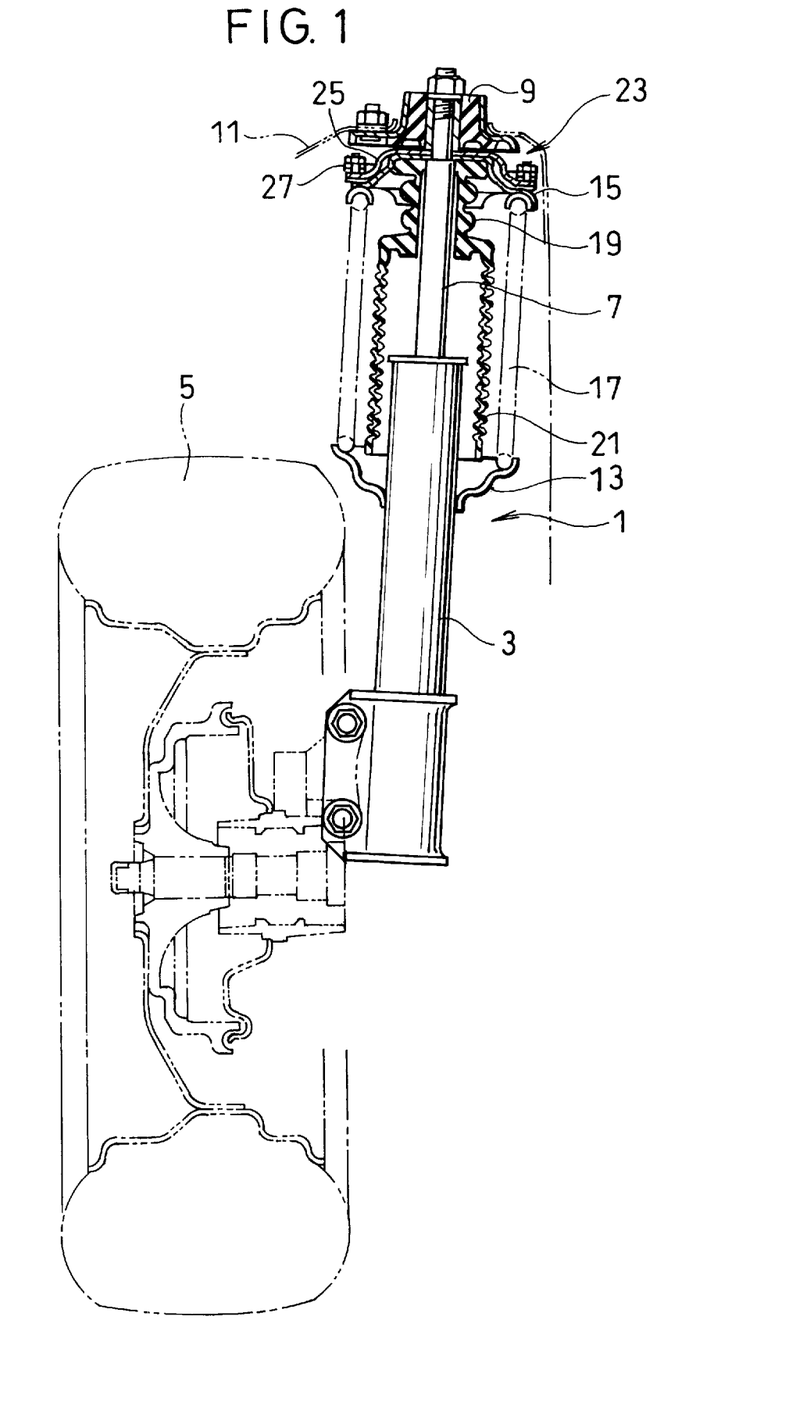
FIG. 1 is a partially sectional elevational view showing a first embodiment of a suspension system according to the present invention.

FIG. 1 is an elevational view of a first embodiment of the present invention, in which numeral 1 denotes a strut of a rear suspension system, which is arranged substantially in the vertical direction of a vehicle. The strut 1 is connected at a lower end thereof with a rear wheel through an outer tube 3 and is connected at an upper end thereof with a body, for example a wheel apron 11 through a strut mount 9 secured to a piston rod 7, respectively.

Further, the outer tube 3 is rigidly connected at a middle portion thereof with a lower spring seat 13 and the piston rod 7 is rigidly connected at an upper portion thereof with an upper spring seat 15. A coil spring 17 is arranged around the strut 1 and is seated on both spring seats 13, 15, respectively. Further, a bump stopper 19 is provided around the piston rod 7 such that it projects downwardly from the upper spring seat 15 and a dust boot 21 is provided around the piston rod 7 and an upper part of the outer tube 3 so as to cover the piston rod 7 such that it projects long downwardly from the lower end of the bump stopper 19.

Figure 2:
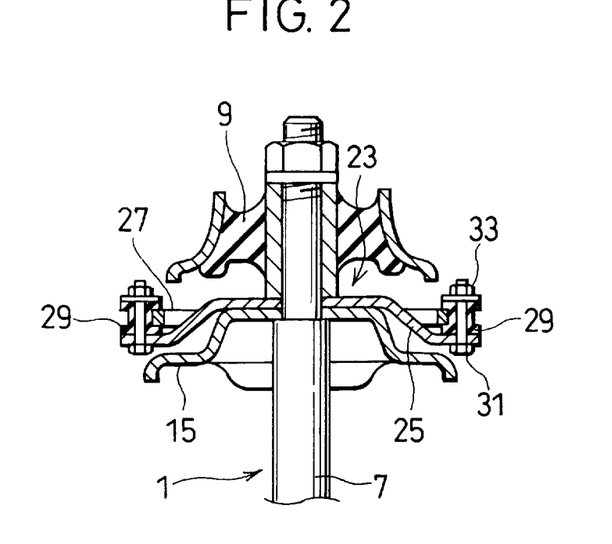
FIG. 2 is a partially enlarged sectional view of an essential portion of FIG. 1.
Figure 3:
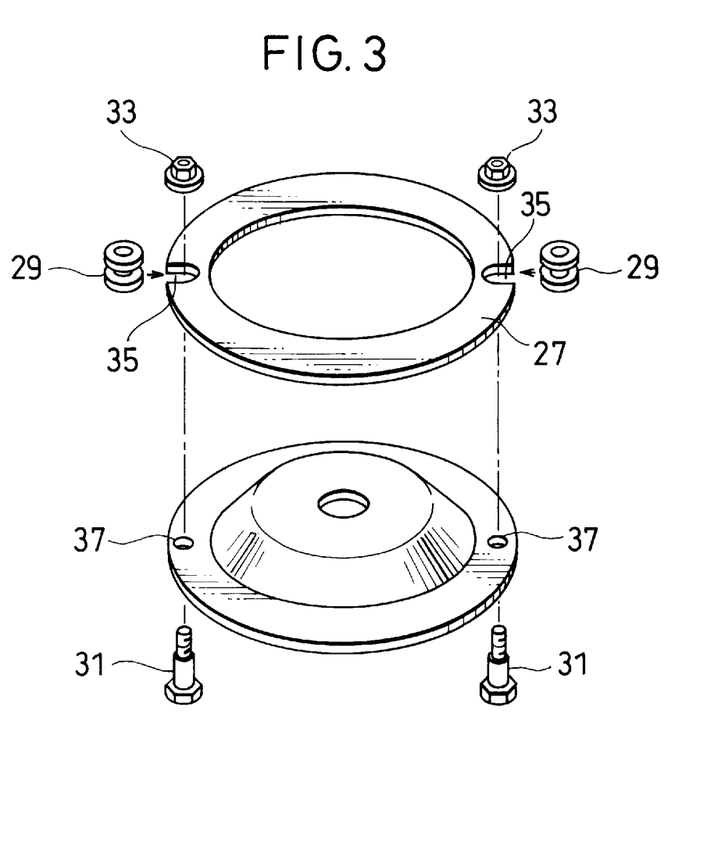
FIG. 3 is an exploded perspective view of an essential portion of FIG. 2.

According to the first embodiment, a dynamic damper 23 is attached to the piston 7 between the upper spring seat 15 and the strut mount 9. Details of the dynamic damper 23 are shown in FIGS. 2 and 3. The dynamic damper 23 comprises a dish-shaped supporting plate 25 which is tightened to the piston rod 7 together with the upper spring seat 15 and a ring-shaped or annular inertia mass body 27 supported, at two edge portions thereof located opposite to each other across the diameter, by the supporting plate 25 via an elastic member 29. The inertia mass body 27 is adjusted so as to weigh 190 grams for example.

The elastic member 29 is made of rubber or elastomer molded cylindrically with a constricted portion at the intermediate part in the axial direction thereof. The inertia mass body 27 is tightened by a bolt 31 passing through the hollow elastic member 29 and a nut 33 on the supporting plate 25 while the inertia mass body 27 is fitted to the constricted portion of the elastic member 29. This construction enables the elastic member 29 to have spring functions both in the vertical and lateral direction with respect to an axis of the elastic member 29. Further, the construction enables to reduce the mass of the elastic member 29 when the elastic member 29 is fitted over the inertia mass body 27 and to reduce the initial spring force.

The inertia mass body 27 has two arc-shaped notches 35, 35 having an opening provided opposite to each other in the diameter direction thereof. The elastic member 29 can be easily attached to the inertia mass body 27 by pushing the elastic member 29 sideways from the opening of the inertia mass body 27 while the constricted portion is fitted to the notch 35. Therefore, it is not necessary to insert the elastic member 29 forcedly into a through hole and the like from the axial direction.

When the inertia mass body 27 vibrates along a plane orthogonal with respect to the axis line thereof, the amount of elastic deformation of the elastic member 29 is small. With respect to a vibration in the direction forming the arc-shaped notch 35, the elastic member 29 provides a small spring constant and with respect to a vibration in the direction orthogonal to this, the elastic member 29 provides a relatively large spring constant.

The bolt 31 has a shoulder so as to restrict an amount of a tightening length, that is, a compression amount of the elastic member 29 when the bolt 31 is tightened through a bolthole 37. As a result, the amount of compression of the elastic member 29 when the dynamic damper 23 is installed, is kept constant, thereby an initial spring force of the dynamic damper 23 can be established with small dispersion.

Figure 4:
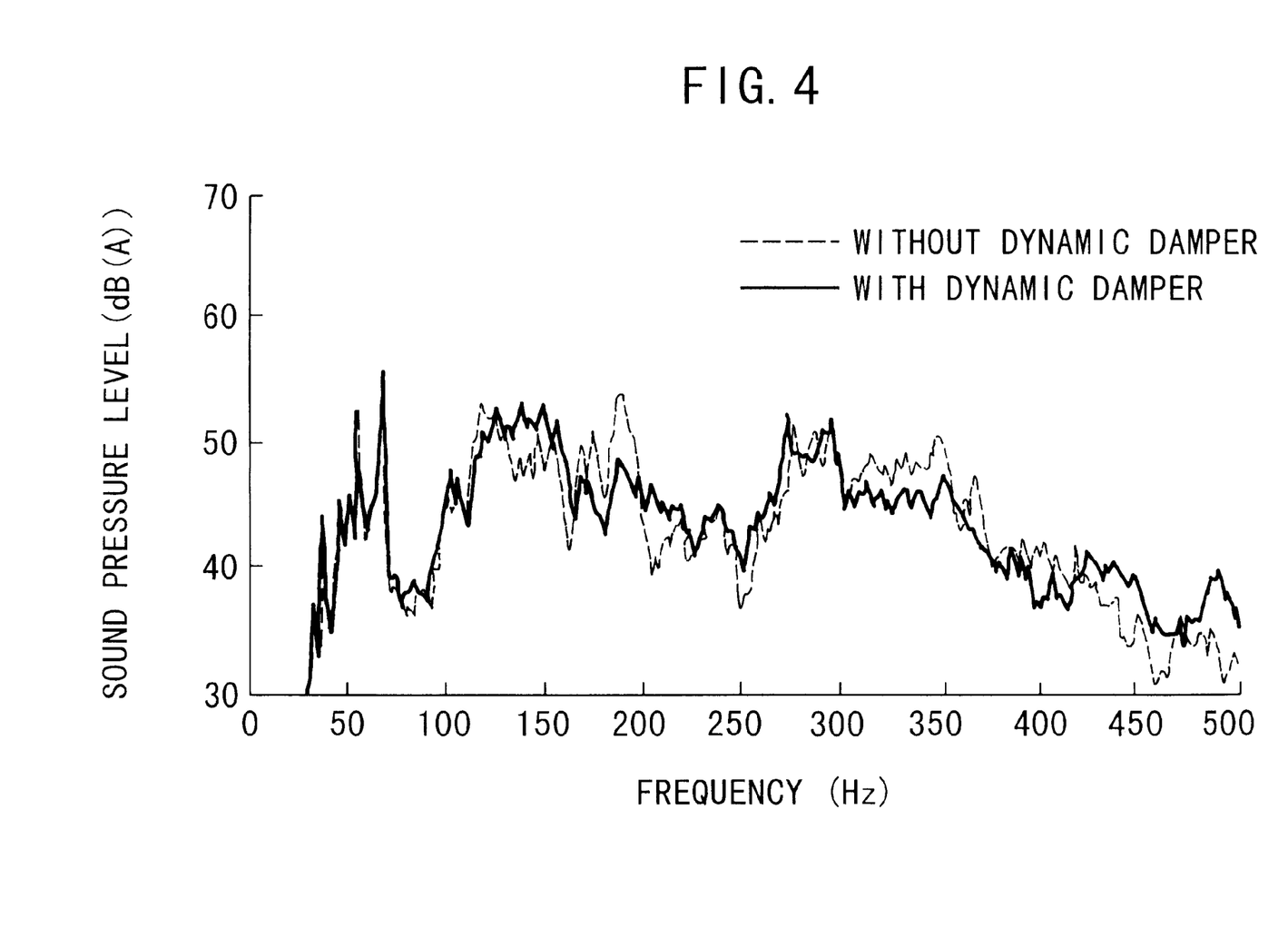
FIG. 4 is a graph showing a noise spectrum of a suspension system according to a first embodiment.

In thus constituted suspension system 1, first the mass of the inertia mass body 27 is established to be 190 grams for example. Then, an appropriate relative position of two elastic members 29 is selected such that 29 the natural frequency of the dynamic damper 23 in the lateral direction of the vehicle is, for example 340 Hz and the natural frequency thereof in the vertical direction is, for example 180 Hz. When the dynamic damper 23 has these physical values, the noise spectrum in the rear seat of the vehicle is shown by a solid line of FIG. 4. As shown, it is known that noises are largely reduced both in the medium frequency band (310 to 370 Hz) and in the low frequency band (160 to 190 Hz, respectively, compared with noises according to the prior art, which are shown by a broken line.

Figure 5:
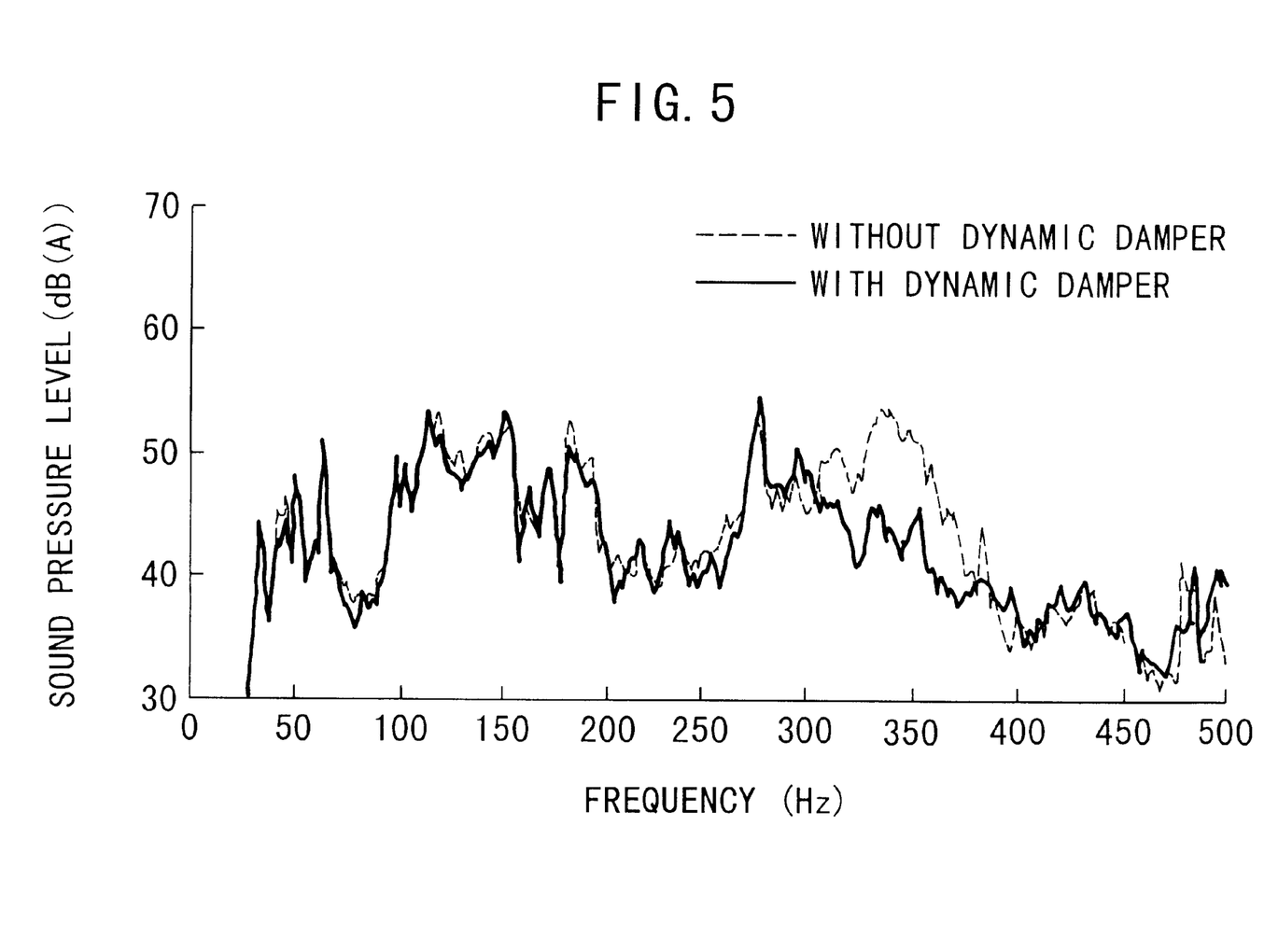
FIG. 5 is a graph showing a noise spectrum of a suspension system when its vertical natural frequency is varied.

Incidentally, when the natural frequency of the dynamic damper 23 in the lateral direction of the vehicle is set to 340 Hz and the one in the vertical direction is set to 300 Hz, FIG. 5 shows that noises can be reduced in the medium frequency band, but the reduction of noises can not be accomplished in the low frequency band.

In the aforesaid embodiment, a tuning of the dynamic damper 23, that is, an adjustment of the spring constant or spring characteristic, are performed by changing the location of two elastic members 29. In other ways, the tuning of the dynamic damper 23 also can be performed by changing the hardness of the elastic member 29, changing the amount of tightening of the bolt 31 or the like.

Further, in the aforesaid embodiment, the installation of the dynamic damper 23 on the supporting plate 25 is performed by use of the bolt 31 and nut 33. Instead of using bolt and nut, the installation can be achieved by bonding the elastic member to both the supporting plate 25 and inertia mass body 27 or directly vulcanizing both of them. This method is dependant upon the size and volume of the elastic member and the tuning of the dynamic damper 23 can be performed with high accuracy without being affected by the tightening amount of bolt, a mass of bolt and the like.

Figure 6:
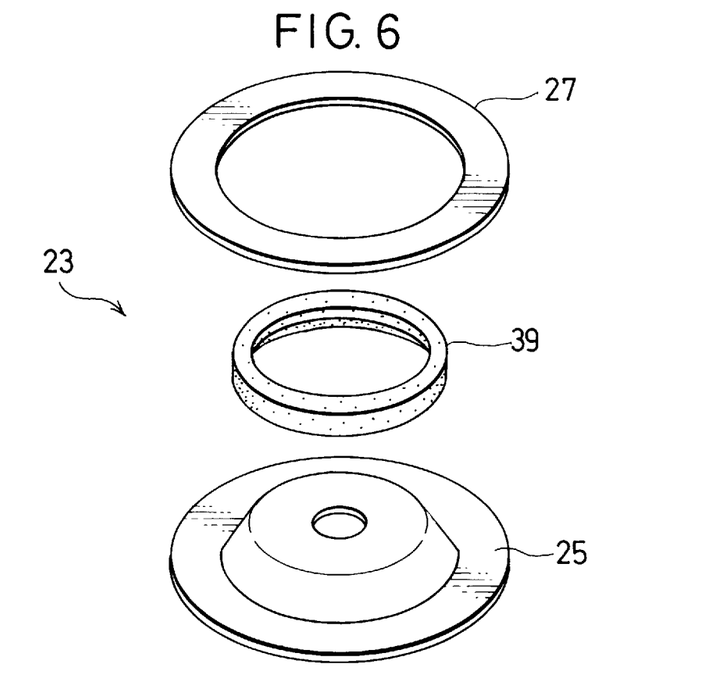
FIG. 6 is an exploded perspective view of an essential portion of a suspension system according to a second embodiment of the present invention.
Figure 7:
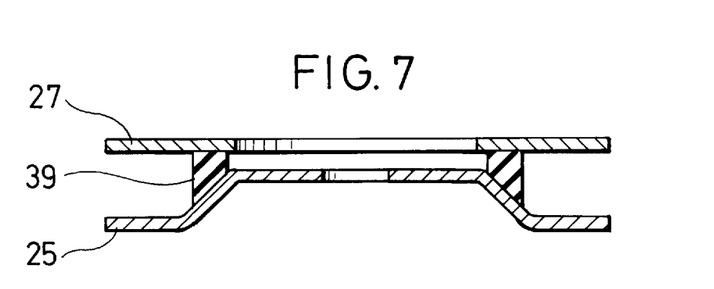
FIG. 7 is a sectional view of an essential portion of a suspension system shown in FIG. 6.
Figure 8:
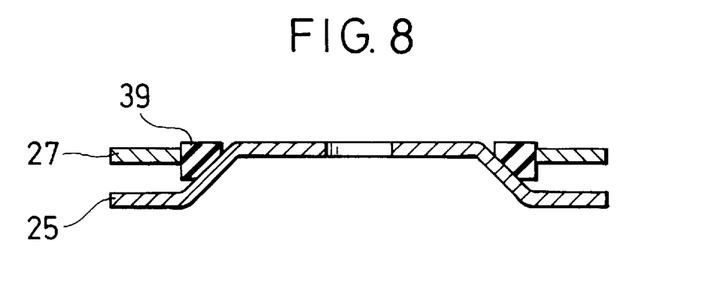
FIG. 8 is a sectional view of an essential portion of a suspension system according to a variation of the second embodiment.

FIGS. 6, 7 and 8 show several examples according to a second embodiment. Referring to FIG. 6, an annular elastic member 39 made of rubber or elastomer is bonded to both the supporting plate 25 and the inertia mass body 27 over the entire periphery thereof.

Thus constituted dynamic damper 23 has no directivity within a plane orthogonal to its axis, therefore there is no need for adjusting the installation direction of the dynamic damper in order to obtain an appropriate natural frequency.

As shown in FIG. 7, the dynamic damper 23 may be accomplished by bonding the elastic member 39 to the supporting plate 25 and then bonding the inertia mass body 2 to the elastic member 39. Further, as shown in FIG. 8, the inner periphery of the annular inertia mass body 27 may be bonded to the outer periphery of the elastic member 39.

Particularly, in case of the dynamic damper 23 as shown in FIG. 8, since the annular elastic member 39 is bonded at the inner periphery surface thereof to the slanted periphery surface of the dish-shaped supporting plate 25, the annular elastic member 39 is subjected to an elastic deformation mainly in the shearing direction when an axial vibration is applied, and it is subjected to an elastic deformation mainly in the expansion and compression direction when a radial vibration is applied. Therefore, the spring constant becomes small in the axial direction and becomes large in the radial direction. As a result, the dynamic damper of this type has a small natural frequency in the axial direction and a large natural frequency in the radial direction and it becomes easier to reduce noises both in low and medium frequency bands.

Figure 9:
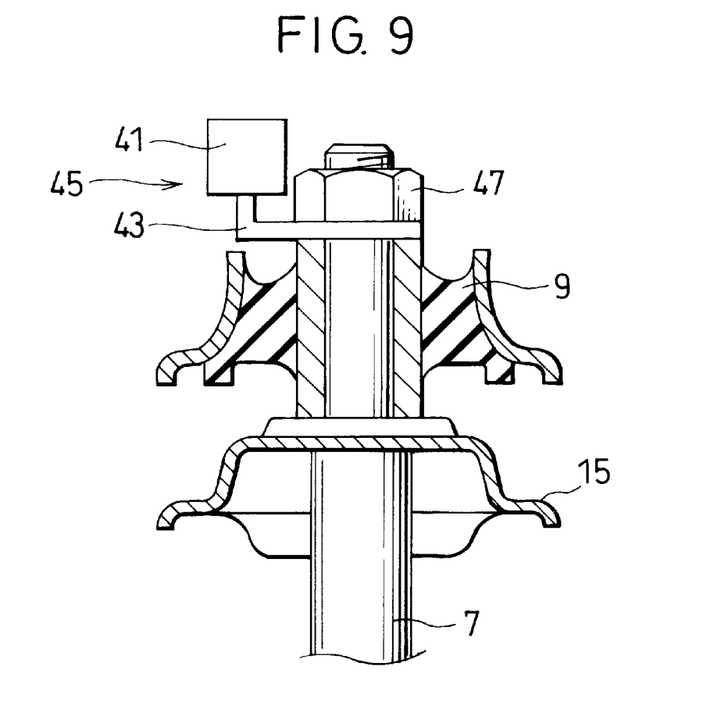
FIG. 9 is a sectional view of an essential portion of a suspension system according to a third embodiment of the present invention.

FIG. 9 shows a dynamic damper 45 according to a third embodiment of the present invention. This dynamic damper 45 comprises a bracket 43 secured to an upper end of the piston rod 7 above the strut mount 9 by a nut 47 and outwardly projecting in a direction orthogonal to the strut axis and an inertia mass body 41 connected with an end portion of the bracket 43 apart from the strut axis. The installation direction of the inertia mass body 41 can be adjusted by rotating the bracket 43 about the strut axis. Further, the amplitude of the inertia mass body 41 can be adjusted by selecting the projection length of the bracket 43.

Figure 10:
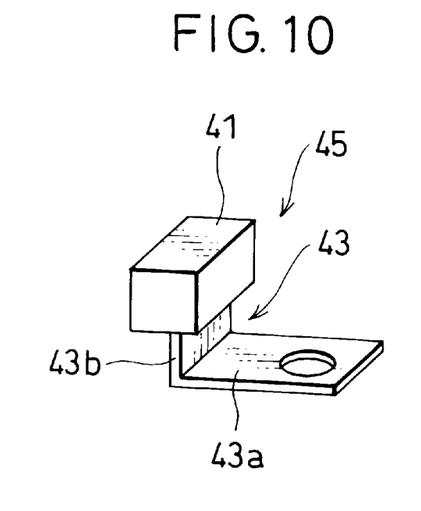
FIG. 10 is a perspective view of an essential portion of a suspension system shown in FIG. 9.

As shown in FIG. 10, the bracket 43 comprises a stay 43a extending in a horizontal direction orthogonal to the strut axis and a vertical portion 43b vertically, upwardly rising from the end of the stay 43a. The inertia mass body 41 having a specified mass is secured to an upper end of the vertical portion 43b.

When such dynamic damper 45 is used for damping resonance vibrations in the lateral direction of the vehicle, the offsetting direction of the inertia mass body 41 with respect to the strut axis must be a lateral direction of the vehicle and the spring constant of the vertical portion 43b in the radial direction with respect to the strut axis must be established at a required value. Further, when the dynamic damper 45 is also used for damping vibrations in the direction of the strut axis, the spring constant of the stay 43a in the direction of the strut axis must be established at a required value.

The selection of these spring constants is also performed by changing material and thickness of the bracket 43, length and width of components, and the like.

Figure 11:
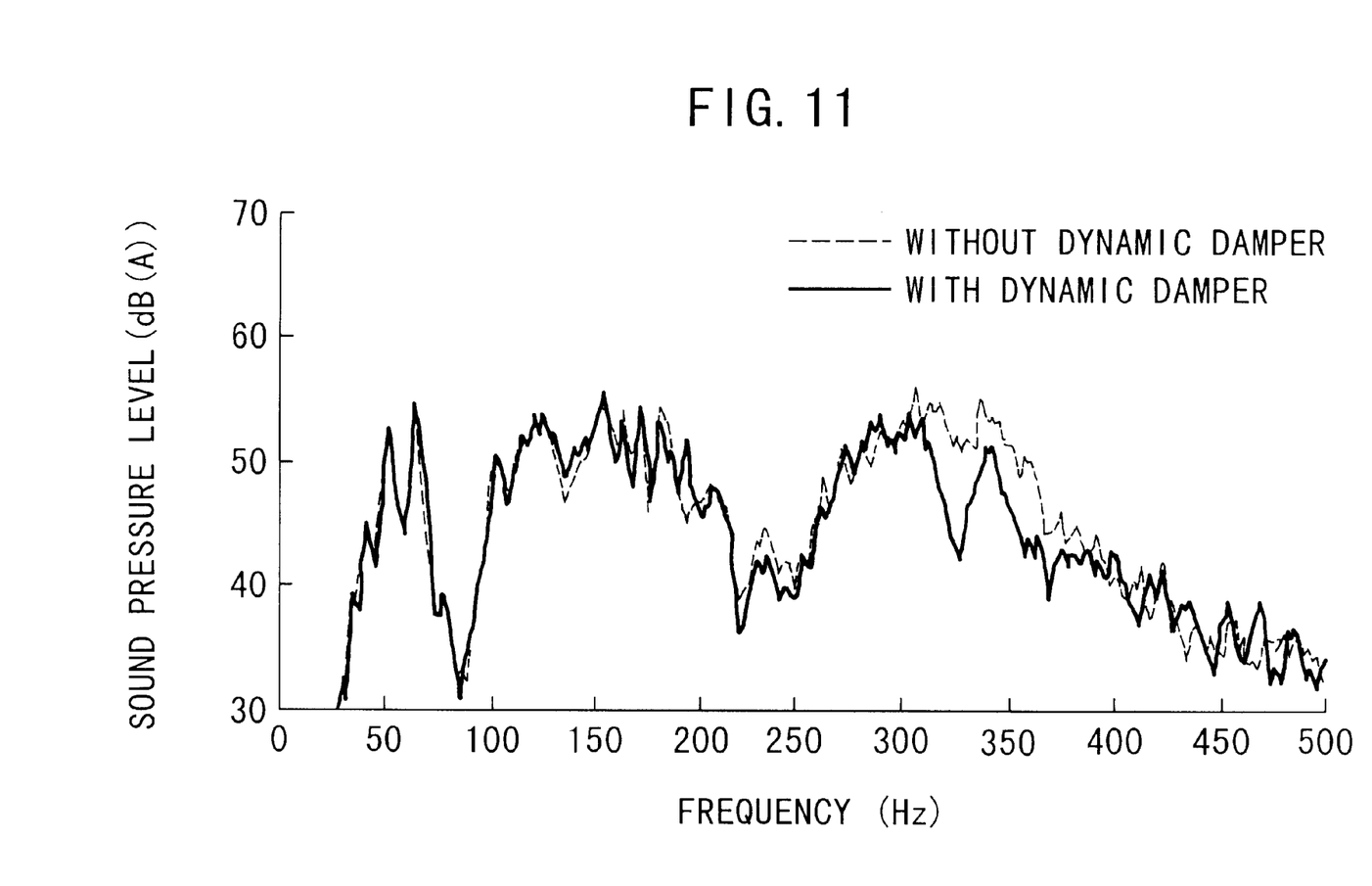
FIG. 11 is a graph showing a noise spectrum of a suspension system according to a third embodiment.

A noise spectrum at the rear seat of the vehicle, when the natural frequency of thus constituted dynamic damper 45 in the lateral direction of the vehicle is tuned to 340 Hz, is shown by a solid line of FIG. 11. According to this spectrum diagram, it is known that noises can be reduced effectively at the medium frequency band ranging from 310 to 380 Hz.

Figure 12:
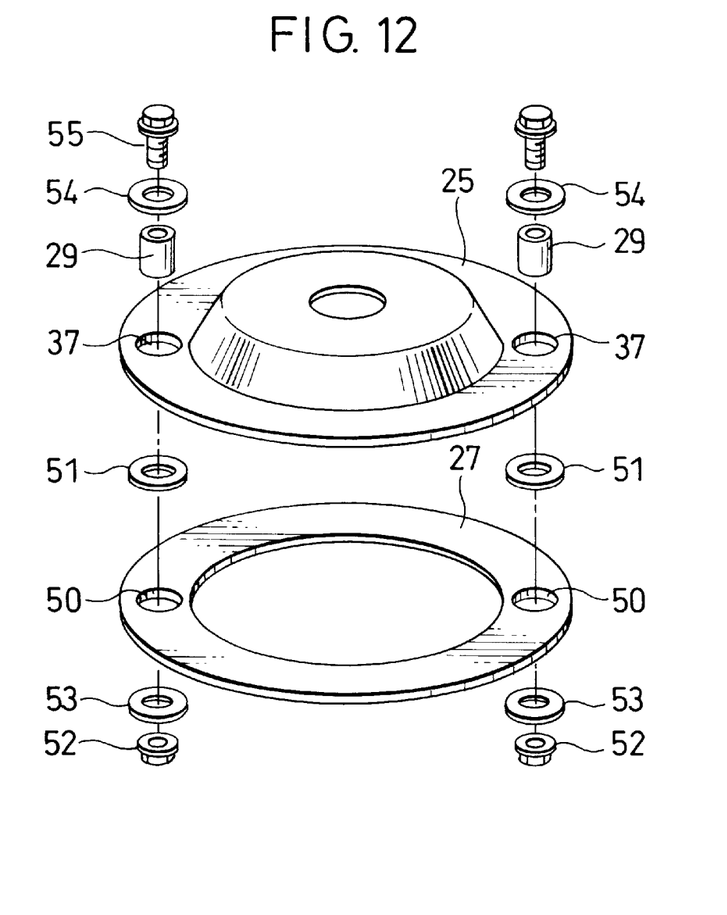
FIG. 12 is an exploded perspective view of an essential portion of a fourth embodiment of the present invention.
Figure 13:
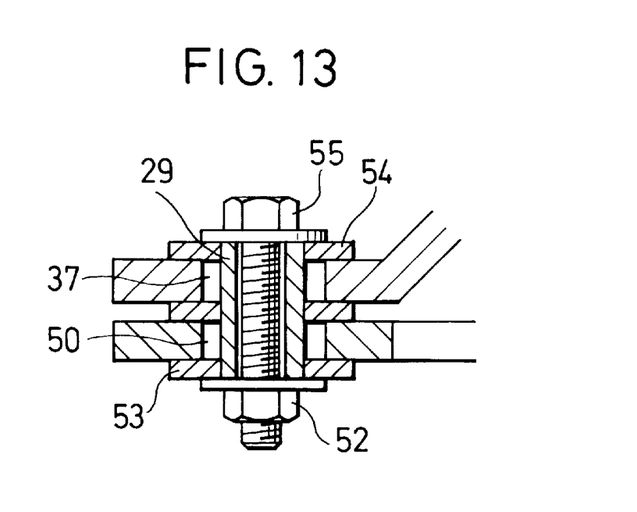
FIG. 13 is a partially sectional view of a fourth embodiment shown in FIG. 12.

FIGS. 12 and 13 show a dynamic damper according to a fourth embodiment of the present invention. This embodiment is a variation of the first embodiment and is different from the first embodiment only in the installation method of the inertia mass body 27 on the supporting plate 25. In this embodiment, the inertia mass body 27 is connected to the supporting plate 25 by a flange bolt 55 and nut 52 through a cylindrical elastic member 29 and rubber seats 51, 53, 54. That is, the cylindrical elastic member 29 is inserted to bolt holes 37, 50 provided in the supporting plate 25 and the inertia mass body 27, respectively. Then, the flange bolt 55 is inserted to the elastic member 29 and is tightened together with the rubber seat 54 on the supporting plate 25, the rubber seat 51 between the supporting plate 25 and the inertia mass body 27, and the rubber seat 53 under the inertia mass body 27.

The natural frequency of this type of the dynamic damper can be tuned by the tightening force of the bolt. On the other hand, when the elastic member 29 is replaced with a metal-made member, the tightening force of the bolt can be prevented from being reduced due to the deterioration of rubber.

According to the suspension system of the present invention, since the dynamic damper is provided at the upper end of the strut or adjacent to the upper end thereof, an interference of the dynamic damper with the wheel apron and other body components can be prevented. Further, noises at the medium frequency band caused by resonance of the strut in the lateral direction of the vehicle, and more preferably, noises at the low frequency band caused by resonance of the strut in the vertical direction, can be effectively reduced.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A suspension system for a vehicle having a strut vertically provided between a vehicle wheel and a strut mount, said strut including an outer tube, a piston rod, and a coil spring arranged around said outer tube and said piston rod, the suspension system comprising:
a lower spring seat for supporting a lower end of said spring;
an upper spring seat for supporting an upper end of said spring;
a dynamic damper provided above said upper spring seat for damping resonance of said strut;
wherein said dynamic damper includes:
a supporting plate mounted on said upper spring seat around said piston rod, and
an annular inertia mass body mounted on said supporting plate through at least an elastic member,
wherein said annular inertia mass body is supported at two edge portions therein on said supporting plate by a bolt and nut,
wherein said bolt is a shoulder bolt.

2. A suspension system for a vehicle having a strut vertically provided between a vehicle wheel and a strut mount, said strut including an outer tube, a piston rod, and a coil spring arranged around said outer tube and said piston rod, the suspension system comprising:
a lower spring seat for supporting a lower end of said spring;
an upper spring seat for supporting an upper end of said spring;
a dynamic damper provided above said upper spring seat for damping resonance of said strut;
wherein said dynamic damper includes:
a supporting plate mounted on said upper spring seat around said piston rod, and
an annular inertia mass body mounted on said supporting plate through at least an elastic member,
wherein said annular inertia mass body is supported at two edge portions therein on said supporting plate,
wherein said two edge portions are located opposite to each other across a diameter of the inertia mass body.

3. The suspension system according to claim 2, wherein said elastic member is made of rubber.

4. The suspension system according to claim 2, wherein said elastic member is made of elastic synthetic resin.

5. The suspension system according to claim 2, wherein said annular inertia mass body is supported at two edge portions thereof on said supporting plate through a cylindrical member and an elastic seat.

6. The suspension system according to claim 5, wherein said cylindrical member is formed from elastic material.

7. The suspension system according to claim 5, wherein said cylindrical member is formed from metal.

8. A suspension system for a vehicle having a strut provided between a vehicle wheel and a vehicle body, said strut including a piston rod, an upper spring seat, a lower spring seat, and a coil spring arranged between said upper and lower spring seats, the suspension system comprising:
a dynamic damper for damping resonance of said strut, wherein said dynamic damper includes:
a supporting plate tightened to said piston rod;
an elastic member,
an inertia mass body mounted on said supporting plate, and
means for supporting said inertia mass body on said supporting plate through said elastic member to enable tuning a compression amount of said elastic member.

9. The suspension system according to claim 8, wherein said inertia mass body is supported at a notch portion having an opening provided in an edge portion therein on said supporting plate through said elastic member attached to said notch.

10. The suspension system according to claim 8, wherein said inertia mass body is supported at two edge portions therein located opposite to each other across a diameter on said supporting plate.

11. The suspension system according to claim 8, wherein said means for supporting includes a bolt having a shoulder so as to restrict an amount of tightening length and a nut.

12. A suspension system for a vehicle having a strut provided between a vehicle wheel and a vehicle body, said strut including a piston rod, an upper spring seat, a lower spring seat, and a coil spring arranged between said upper and lower spring seats, the suspension system comprising:
   a dynamic damper for damping resonance of said strut, wherein said dynamic damper includes:
      a supporting plate foamed as a dish shaped plate and tightened to said piston rod;
      an elastic member with one side thereof mounted on a slanted periphery surface of said supporting plate; and
      an inertia member supported on another side of said elastic member.

13. The suspension system according to claim 12, wherein said another side of elastic member is bonded to an inner periphery surface of said inertia member.

* * * * *